United States Patent [19]

Mori

[11] Patent Number: 4,463,410
[45] Date of Patent: Jul. 31, 1984

[54] LIGHTING DEVICE WITH DUAL REFLECTING MEMBERS

[76] Inventor: Kei Mori, 3-16-3-501, Kaminoge, Setagaya-ku, Tokyo, Japan

[21] Appl. No.: 276,024

[22] Filed: Jun. 22, 1981

[30] Foreign Application Priority Data

Jun. 27, 1980 [JP] Japan .................................. 55-87278
Mar. 16, 1981 [JP] Japan .................................. 56-37384

[51] Int. Cl.³ .......................................... F21V 19/04
[52] U.S. Cl. ...................................... 362/20; 362/32;
362/267; 362/276; 362/293; 362/299; 362/300;
362/301; 362/302; 362/328; 362/329; 362/346;
362/347; 362/349; 362/355; 362/375; 362/241;
362/245; 362/246
[58] Field of Search .................. 362/32, 300, 301, 303,
362/346, 347, 307, 276, 349, 355, 343, 302, 350,
375, 299, 293, 328, 329, 247, 240, 267, 241, 243,
245, 246, 61, 2, 298; 350/258–260, 262, 264–265

[56] References Cited

U.S. PATENT DOCUMENTS

| | | | |
|---|---|---|---|
| 999,813 | 8/1911 | Losey | 362/298 |
| 1,604,213 | 10/1926 | Zorger | 362/61 X |
| 1,885,842 | 11/1932 | Kurtz | 362/299 |
| 2,228,476 | 1/1941 | Murray | 362/303 X |
| 2,755,374 | 7/1956 | Ott et al. | 362/298 X |
| 2,981,827 | 4/1961 | Orsatti et al. | 362/299 X |
| 3,355,982 | 12/1967 | Rendina | 362/2 X |
| 3,536,908 | 10/1970 | Oster | 362/123 X |
| 4,037,096 | 7/1977 | Brendgord et al. | 362/298 X |
| 4,053,756 | 10/1977 | Takahashi | 362/7 |
| 4,306,769 | 12/1981 | Martinet | 350/264 |

FOREIGN PATENT DOCUMENTS

| | | | |
|---|---|---|---|
| 43081 | 1/1982 | European Pat. Off. | 362/300 |
| 385456 | 12/1932 | United Kingdom | 362/299 |

Primary Examiner—Donald G. Kelly
Assistant Examiner—John S. Maples
Attorney, Agent, or Firm—Merchant, Gould, Smith, Edell, Welter & Schmidt

[57] ABSTRACT

A lighting device operable with solar beams propagating through and emitting from the optical wave guides. A pair of spaced concave and convex reflecting members are provided to effectively diffuse the solar beams issuing from the exit end of the optical wave guides. One of the reflecting members may be constituted by a mirrored electric bulb in order to ensure the lighting device to operate also by electric power.

8 Claims, 2 Drawing Figures

LIGHTING DEVICE WITH DUAL REFLECTING MEMBERS

This invention relates to the art of interior lighting and, more particularly, to a novel lighting device wherein light rays, especially solar beams, propagating through and issuing from optical wave guides are used as a light source.

This invention may be advantageously used for lighting the interior of human occupancies such as rooms of a building, underground bomb shelters, underwater enclosures, and so on, with the natural solar beams or light rays collected on the earth's surface.

Hitherto, various attempts have been made for utilization of the solar energy reaching the earth's surface. However, most of the prior art solar energy systems involve the transformation of the captured solar energy into electric or thermal energy and, as far as the inventor is aware, there are very few that directly utilize the solar beams themselves as a source of optical energy. It is obvious that, in lighting applications, the use of solar energy in the form of optical energy is advantageous since transformation loss is obviated.

With a view to provide a solar system which employs solar radiation as a light source, the inventor has previously developed an apparatus for collecting solar beams that is capable of condensing the solar beams so that they are introduced into a bundle of optical wave guides (Japanese patent application laid-open publication No. 55-29055 (1980)). With this apparatus, the light rays or solar beams, being reflected at the boundary surface of the optical wave guides, propagate there-along and then issue out of the wave guides from their exit end. The angle of emission of the light rays as they issue out of the exit end of the optical wave guides depends on the critical angle of incidence of the material forming the optical wave guides and, normally, is not greater than 48° for an optical fiber made from pure silicate. When the light rays are allowed to issue from such optical wave guides for the purpose of illumination of the interior of a room, illumination takes place in a spotlight-like fashion. Thus, it is not possible to illuminate a sufficiently wide area with soft or subdued light rays or solar beams.

The primary object of the invention is to ensure that the beams of light rays propagating through and issuing out of an end of optical wave guides are effectively diffused so that an extended area of a room is illuminated with appropriately subdued light rays.

According to the invention, there is provided a lighting device which comprises: a fitting for optical wave guides having an aperture for receiving therein an end of at least one optical wave guide; a first reflecting member connected to said fitting and having an opening for allowing the light rays issuing from the optical wave guide to pass there-through, said first reflecting member having a downwardly curved wall to define a concave lower surface, at least part of said lower surface adjacent said opening being provided with a reflecting surface, and; a second reflecting member spaced from and aligned with said opening in said first reflecting member, said second reflecting member having a convex reflecting surface facing the concave lower reflecting surface of said first member. With this arrangement, the light rays issuing from the optical wave guides and impinging upon the second reflecting member are reflected towards the first reflecting member and then reflected by the lower surface of the first member downwardly, thereby causing the light rays to be diffused outwardly over a wide area.

Preferably, the bottom opening of the downwardly curved first reflecting member is closed with a flat transparent or translucent bottom plate to form a substantially hermetically sealed space there-between so that the surfaces of the first and second reflecting members are shut-off from airborne particles and dust.

Also, the second reflecting member may advantageously be provided with a central opening aligned with the opening in the first reflecting member so as to alloww a portion of the light rays to pass downwardly there-through and a diverging lens is proved on the bottom plate in alignment with the central opening. With these provisions, the area below the second reflecting member that would otherwise be shaded by the latter may be illuminated with light rays of sufficient intensity.

Preferably, the part of the first reflecting member other than that provided with the reflecting surface may be made translucent to ensure that a portion of the light rays reflecting towards the first member transmit there-through to thereby illuminate the area above the level of the lighting device.

In another embodiment, a second light source may be provided on the bottom plate. Such second light source may be a lamp such as mirrored incandescent bulb provided with a mirror surface which constitutes said second reflecting member. With this arrangement, illumination may be performed with the solar beams when, during the daytime, the solar beams are available at the solar beam collecting apparatus while the lighting device may be operated with electric power when the solar beams are not available or have not sufficient luminous intensity.

It is possible to arrange a daylight filter adjacent the lower part of the mirrored incandescent bulb so that a daylight hue is obtained during electric powered operation of the lighting device.

Preferably, an optical sensor or photo-sensor may be provided on the first reflecting member at the vicinity of the opening thereof. The optical sensor issues a signal when the intensity of the solar beams propagating through the optical wave guides is decreased beyond a predetermined level and then actuate a relay to turn on to supply electric current to the incandescent bulb. Thus, the lighting device according to the invention can be switched over automatically from a mode wherein the solar beams are used as a light source to a mode wherein the electric bulb is operated, and vice versa.

The sealed space formed between the first reflecting member and the bottom plate may be filled-in with an inert gas to prevent any deterioration of the elements housed therein.

The invention will now be described in more detail with reference to the embodiments thereof illustrated in the accompanying drawings, in which.

Figure 1:
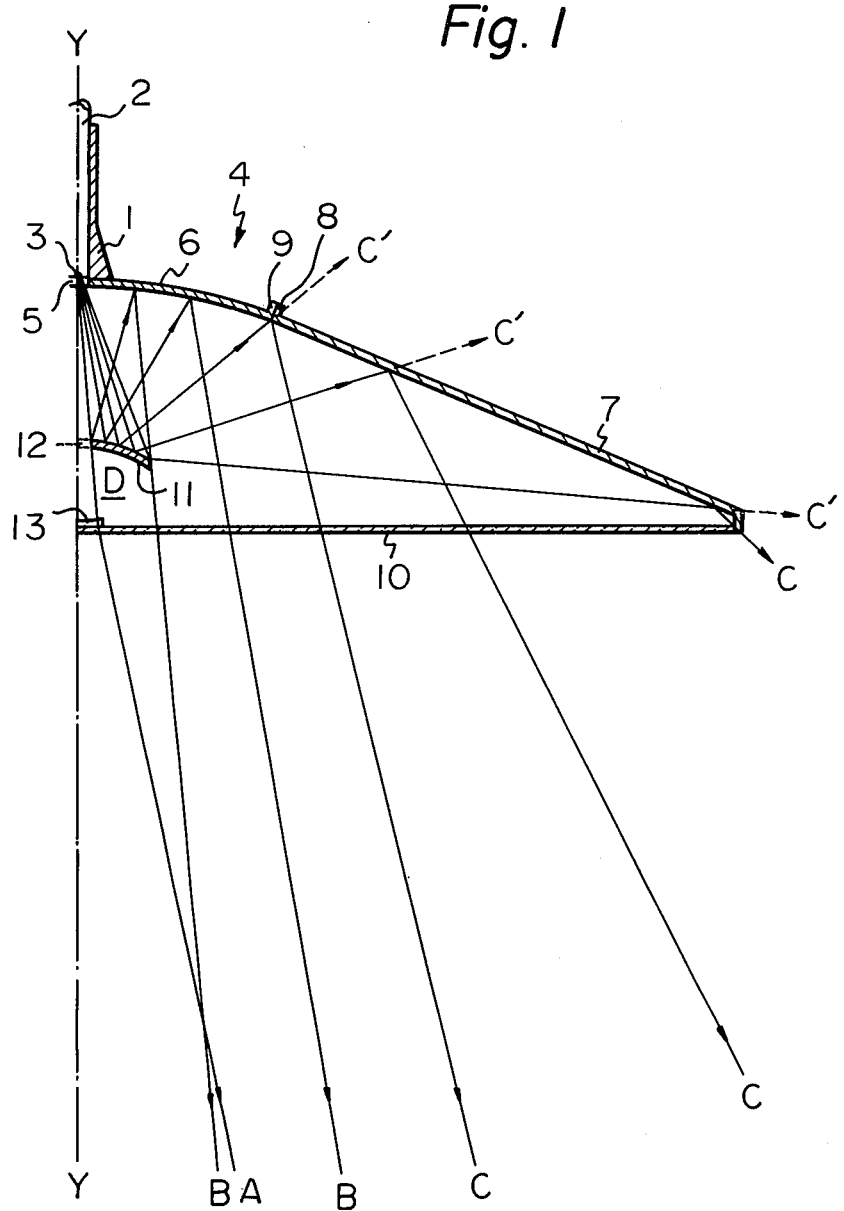
FIG. 1 is a cross-sectional view of a half of a lighting device according to the invention, as divided by a plane including the axis of symmetry Y—Y.

Referring to FIG. 1, the lighting device according to the invention includes a generally tubular fitting 1 in which an end section of a cable 2 of the optical wave guides is grippingly inserted. A commercially available cable of optical wave guides comprises a bundle of optical fibers covered with a common protective sheath. The optical cable 2 is retained in the fitting 1 in such a manner that its light ray emitting end is positioned as at 3. The other end of the cable may be connected optically to a solar beam collecting apparatus 5 (not shown) installed at a suitable outdoor location such as building top, earth's surface, sea surface, and the like, where the solar beams arrive.

The tubular fitting 1 is connected to a first reflecting member 4 by any suitable fastening means such as adhesives and screws in such a manner that the cylindrical aperture in the tubular member 1 is brought into alignment with the opening 5 in the reflecting member 4. Alternatively, the fitting 1 may be screwed into the opening 5 with its externally threaded lower end threadingly engaging the internal threads of the opening.

The first reflecting member 4 is made from a board of plastics such as acrylic resins. In the illustrated embodiment, the first reflecting member comprises a downwardly curved central portion 6 with its lower surface coated with or covered by a mirror forming material such as a thin layer of metal deposited by a conventional evaporation technique, an adjacent translucent portion 7 with its flange 8 connected to a flange 9 of the central portion 6 by means of bolt/nut assemblies. A transparent bottom plate 10 is bonded or fastened to the lower periphery of the translucent portion 7 to form a substantially hermetically sealed cavity therein. An inert gas may be filled in the cavity. Alternatively, the bottom plate 10 may be made from a translucent plate having on it surface a plurality of minute projections and depressions capable of diffusing the light rays in random directions. For this purpose, a plate of cathedral glass may be used.

A second reflecting member 11 is placed in the cavity in an aligned relation with respect to the axis of symmetry Y—Y of the lighting device. This second reflecting member 11 has a convex mirror surface facing the lower surface of the first reflecting member and is held in place by a plurality of supports (not shown) pending from the central portion 6 or upstanding from the bottom plate 10. The central area of the second reflecting member 11 may be made transparent or provided with an opening 12 to permit the light rays to transmit therethrough. A diverging lens 13 such as a concave Fresnel lens is provided at the center of the bottom plate 10.

In use, the light rays such as solar beams propagating via the optical wave guides emit from the exit end 3 of the cable. Those light rays that passed the opening 12 in the second reflecting member 11 go through the diverging lens 13 and, on doing so, are diverged outwardly as shown by an arrow A. Those light rays that have an intermediate angle of emission as measured at the exit end 3 of the optical fibers are reflected backwards by the second reflecting member 11 towards the mirrored portion 6 of the first reflecting member 4 and then reflected by the latter downwards, as shown by arrows B. The outermost light rays are reflected similarly by the second reflecting member 11 but a portion of them transmit the translucent wall of the adjacent portion 7 as they impinge thereon while a portion thereof are reflected downwards, as shown by arrows C and C'.

It will be noted that legs or posts for supporting the second reflecting member 11 on the bottom plate 10 may be advantageously located in the region D which is immediately below the second member 11 and is shaded by the latter, thereby avoiding their shadows to be projected on the floor.

Figure 2:
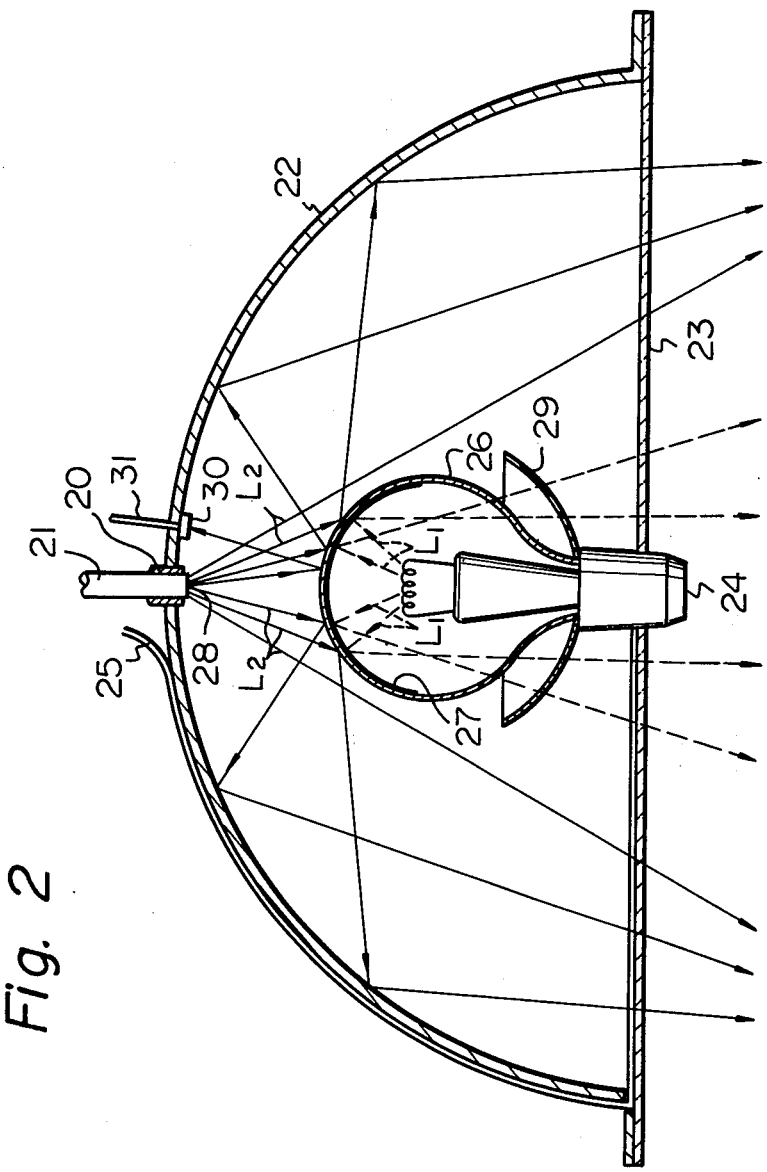
FIG. 2 is a cross-sectional view of another embodiment.

Referring to FIG. 2 there is shown another embodiment of the invention. The lighting device in this embodiment includes a fitting 20 receiving and retaining an optical fiber cable 21, and a first reflecting member 22 with its transparent bottom plate 23. An inert gas such as nitrogen gas may be filled-in in the space defined between the member 22 and bottom plate 23. The inner surface of the reflecting member 22 is provided with a specular mirror surface as in the preceding embodiment. The bottom plate 23 has an aperture in which is mounted a socket 24 connected to an electric power source by means of wires 25.

A mirrored incandescent bulb 26 serving as a second light source is screwed into the socket 24. The mirrored bulb 26, which is commercially available on the market under the name "mirror ball bulb", has a generally spherical glass bulb, the inner surface of which opposite its filament is coated through an angle with a layer of reflecting material 27 to form a mirror surface. Thus, when the incandescent bulb is lighted, the light rays $L_1$ emitted from the filament and directed upwardly as viewed in the drawing are reflected downwards by the mirror surface 27 while the light rays directed towards the region of the bulb not provided with the reflecting material transmit therethrough. When the solar beam collector placed in a sun-lit location is operating, the solar beams issuing from the exit end 28 of the optical cable 21 with a relatively small angle of emission hit upon the mirror surface 27 of the bulb and are then reflected thereby towards the first reflecting member which in turn reflects the solar beams downwardly, as shown by arrows $L_2$.

It will be noted that instead of the incandescent bulb 26, another type of lamp such as, for example, an arc lamp or a fluorescent lamp may be employed as a second light source. In that case, a second reflecting member may be provided at the top of or above the second light source.

When a daylight illumination is desired, a daylight filter 29 may be mounted adjacent the lower part of the bulb 26. This filter, being made for example of a bluish glass, will eliminate the reddish component in the light rays emitted from the bulb 26 so that illumination takes place with light rays of daylight hue.

Indicated at 30 is a photo sensor for detecting the luminous intensity of the light rays issued from the optical wave guides 21. The photo-sensor is positioned at the vicinity of the fitting 20 where the density of the reflected light rays are relatively enhanced. Alternatively, the photo-sensor may be provided at any such location that is capable of detecting the light rays issuing from the optical fiber or reflected by the mirrored bulb but is not affected by the light rays from the lamp. Examples of such photo-sensor are photo-cell, phototransistor and photo-diode. A lead wire 31 from the photo-sensor 30 is connected to a remote relay (not shown). When the luminous intensity of the solar beams emitting from the optical cable are decreased below a predetermined value, the photo-sensor issues a signal to the relay which, in turn, closes its contacts to supply electric power to the bulb 26. Thus, the electric bulb is automatically lighted during the transition period from the daytime to the evening, without resorting to a manual switching operation. However, the photo-sensor is not an essential element and, thus, may be omitted.

It will be apparent that in both embodiments illustrated, the lighting device may be suspended from the ceiling by any suitable suspending means such as pendant fittings.

I claim:

1. A lighting device comprising:
   a fitting for optical wave guide having an aperture for receiving therein an end section of at least one optical wave guide serving as a light source;
   a first reflecting member connected to said fitting and having an opening for allowing the light rays issuing from said optical wave guide to pass there-through, said first reflecting member having a downwardly curved wall to define a concave lower surface, at least part of said lower surface adjacent said opening being provided with a reflecting surface;
   a second reflecting member spaced from and aligned with said opening in said first reflecting member, said second reflecting member having a convex reflecting surface facing the concave lower reflecting surface of said first member so that the light rays issued from the optical wave guide and impinging upon said second member are reflected towards said first member and then reflected by said lower surface of said first member downwardly thereby causing the light rays issued from the optical wave guide to be diffused outwardly;
   said bottom opening of said downwardly curved first member being closed with a transparent flat bottom plate to form a substantially hermetically sealed spaced there-between;
   said second reflecting member having a central opening aligned with said opening in said first member so as to allow the light rays to pass downwardly there-through and wherein a diverging lens is provided on said bottom plate in alignment with said central opening thereby to cause the light rays passed there-through to diverge outwardly; and
   said remaining part of said first reflecting member other than that provided with the reflecting surfaces is translucent.

2. A lighting device as claimed in claim 1, wherein said bottom plate is a translucent plate having on its surface a plurality of minute projections and depressions.

3. A lighting device as claimed in the claim 1, wherein said plate is made from cathedral glass.

4. A lighting device comprising:
   a fitting for an optical wave guide having an aperture for receiving therein an end section of at least one optical wave guide serving as a light source;
   a first reflecting member connected to said fitting and having an opening for allowing the light rays issuing from said optical wave guide to pass there-through, said first reflecting member having a downwardly curved wall to define a concave lower surface, at least part of said lower surface adjacent said opening being provided with a reflecting surface;
   a second reflecting member spaced from and aligned with said opening in said first reflecting member, said second reflecting member having a convex reflecting surface facing the concave lower reflecting surface of said first member so that the light rays issued from the optical wave guide and impinging upon said second member are reflected towards said first member and then reflected by said lower surface of said light member downwardly thereby causing the light rays issued from the optical wave guide to be diffused outwardly;
   said bottom opening of said downwardly curved first member being closed with a transparent flat bottom plate to form a substantially hermetically sealed space there-between;
   a second light source mounted on said bottom plate; and
   said remaining part of said first reflecting member other than that provided with the reflecting surface is translucent.

5. A lighting device as claimed in claim 4, wherein said second light source is a mirrored electric bulb having a mirror surface which constitutes said second reflecting member.

6. A lighting device as claimed in claim 5, wherein a photosensor is provided for detecting the intensity of solar beams issuing from the optical wave guide.

7. A lighting device as claimed in claim 6, wherein an inert gas is filled in the space between the first member and the bottom plate.

8. A lighting device comprising:
   a fitting for optical wave guide having an aperture for receiving therein an end section of at least one optical wave guide serving as a light source;
   a first reflecting member connected to said fitting and having an opening for allowing the light rays issuing from said optical wave guide to pass there-through, said first reflecting member having a downwardly curved wall to define a concave lower surface, at least part of said lower surface adjacent said opening being provided with a reflecting surface,
   a second reflecting member spaced from and aligned with said opening in said first reflecting member, said second reflecting member having a convex reflecting surface facing the concave lower reflecting surface of said first member so that the light rays issued from the optical wave guide and impinging upon said second member are reflected towards said first member and then reflecting by said lower surface of said first member downwardly thereby causing the light rays issued from the optical wave guide to be diffused outwardly;
   said bottom opening of said downwardly curved first member is closed with a transparent flat bottom plate to form a substantially hermetically sealed space there-between.
   said remaining part of said first reflecting member other than that provided with the reflecting surfaces is translucent;
   a second light source comprising a mirrored electric bulb having a mirror surface which constitutes said second reflecting member is mounted on said bottom plate;
   a day light filter is provided adjacent the lower part of said bulb;
   a photosensor is provided for detecting the intensity of solar beams issuing from the optical wave guide; and
   an inert gas is filled in the space between the first member and the bottom plate.

* * * * *

UNITED STATES PATENT AND TRADEMARK OFFICE
CERTIFICATE OF CORRECTION

PATENT NO. : 4,463,410

DATED : July 31, 1984

INVENTOR(S) : Kei Mori

It is certified that error appears in the above-identified patent and that said Letters Patent is hereby corrected as shown below:

Column 2, line 13, "alloww" should be --allow--;

Column 5, line 32, "spaced" should be --space--;

Insert --for transmitting light from a first light source-- after "...device" in line 1 of claims 1, 4 and 8. Further, in line 4 of each of the above-noted claims, "serving as a light source" has been deleted.

Signed and Sealed this

Nineteenth Day of February 1985

[SEAL]

Attest:

DONALD J. QUIGG

Attesting Officer — Acting Commissioner of Patents and Trademarks